L. T. FREDERICK.
METHOD OF MOLDING LONG PLATES.
APPLICATION FILED JULY 10, 1918.
1,321,517.
Patented Nov. 11, 1919.
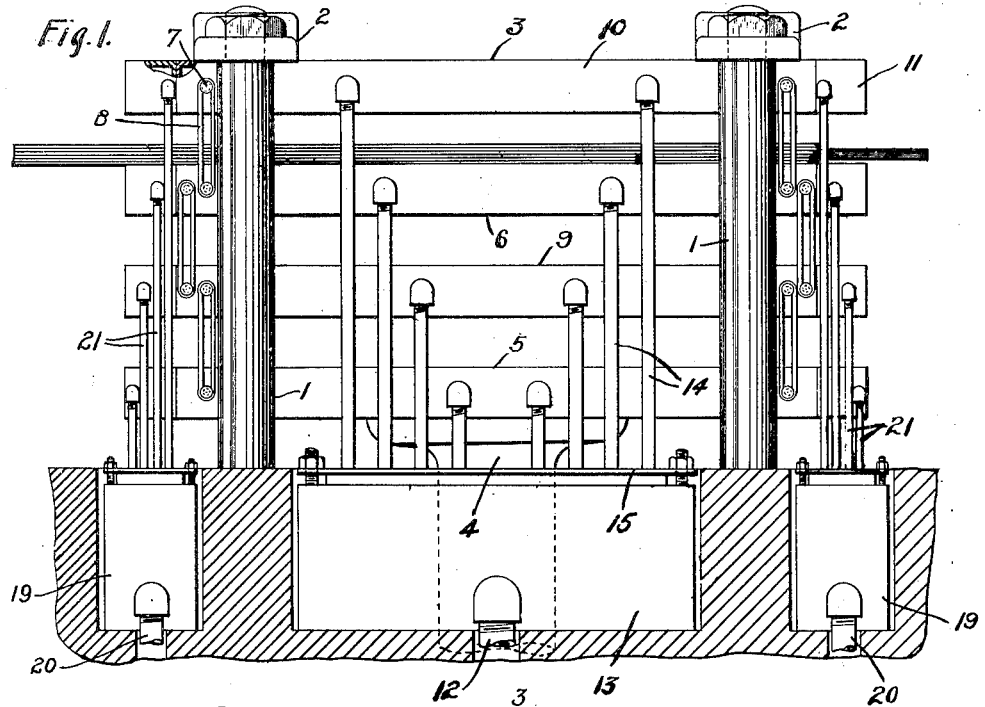
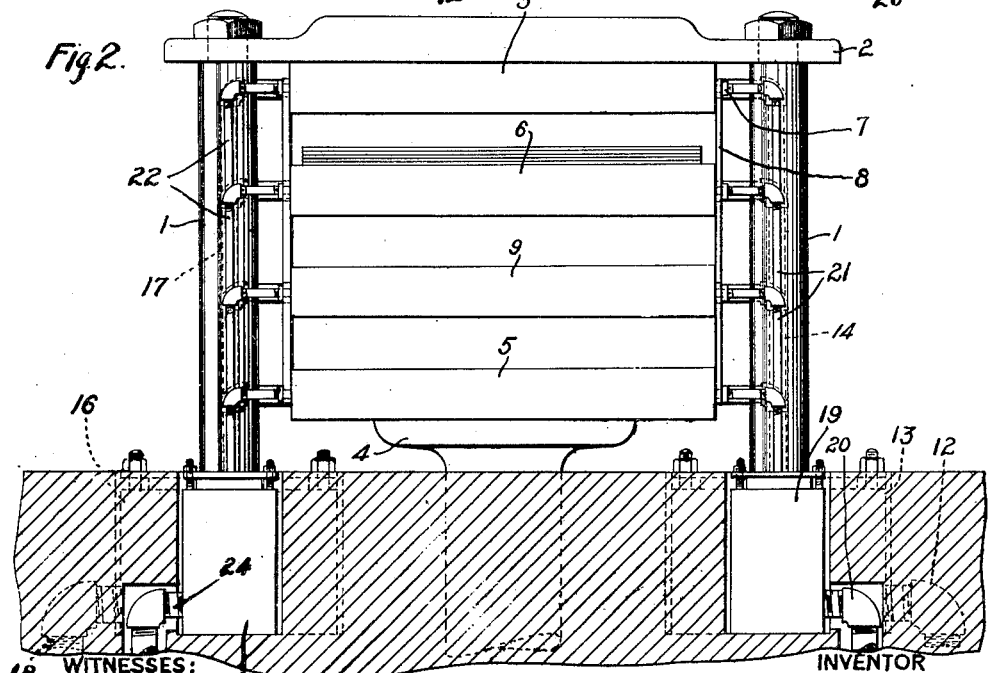
WITNESSES:
INVENTOR
Louis T. Frederick
BY
ATTORNEY

UNITED STATES PATENT OFFICE.

LOUIS T. FREDERICK, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF MOLDING LONG PLATES.

1,321,517.      Specification of Letters Patent.      Patented Nov. 11, 1919.

Application filed July 10, 1918. Serial No. 244,195.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Methods of Molding Long Plates, of which the following is a specification.

My invention relates to a method of and apparatus for molding composite plates, comprising superimposed laminations of fibrous sheet material impregnated with a binder, and more particularly to plates of this character having relatively great length.

Heretofore, relatively short composite plates have been molded by superimposing layers of fibrous sheet material, impregnated with a suitable binder, placing the stacked body thus formed between the heated press plates of a mold press and subjecting them to a pressure of approximately 1,000 pounds to the square inch. Obviously, such plates could be made only in dimensions not exceeding those of the press plates of the press employed. Because of this, it has been impossible to manufacture, in an efficient and practical manner, composite plates of relatively great length, as the high pressure required and the size of the press mold which would be necessary are prohibitive.

One of the primary objects of my invention resides in the provision of a modified form of mold press which will permit pressing and molding of successive portions of a stacked plate so that a plate of any desired length may be passed, in a step-by-step manner, through the press and all of its portions may be successively, uniformly and properly molded.

In this connection, one of the main features of my invention consists in providing a press having sectional press plates in which the intermediate sections are heated while the terminal sections are cooled. Because of this, portions of the stacked sheet may be successively molded and cured by being pressed between the heated sections of the press plate while the portion of the stacked plate previously cured and adjacent the part being cured, as well as the portion of the stacked plate not yet cured and adjacent the part being cured, will be disposed between the cooled portion of the press plates. This will prevent blistering or over-curing of the finished portion of the plate and undesirable partial or preliminary curing of the portion of the plate to be next cured.

With these and other objects in view, my invention will be more fully described; illustrated in the drawings, in the several views of which corresponding reference numerals indicate like parts, and then particularly pointed out in the claims.

In the drawings, Figure 1 is a side elevation, partially in section, of my improved mold press; Fig. 2 is an end elevation, also partially in section, of the mold press, and Fig. 3 is a fragmentary section of one form of press plate.

Referring to these drawings, supporting columns 1 are shown connected, at their upper ends, by cross heads 2 which support a top press plate 3. A vertical movable ram 4, disposed below the press plate 3 and preferably centrally of the frame formed by the columns and cross heads, carries a bottom press plate 5. A press plate 6 is supported by the top press plate 3 by means of headed studs or bolts 7 projecting through slots of hanger links 8, while a press plate 9 is similarly supported by the press plate 6 and is correspondingly connected to the bottom press plate 5. Because of this arrangement, the press plates will normally occupy the positions shown in Figs. 1 and 2 of the drawings but upward movement of the ram 4 will lift the press plate 5 into engagement with the press plate 9 to move the latter into engagement with the press plate 6 and to ultimately bring the press plate 6 into engagement with the press plate 3.

Each of these press plates comprises an intermediate section 10 of relatively great length and relatively short terminal or end sections 11, each of these sections being hollow in construction in order that a heating medium may be circulated through the intermediate sections and a cooling medium may be circulated through the terminal sections. These sections may be separately formed and secured together, as shown in Fig. 1, or a single press plate may be divided into sections by properly disposed partitions, as shown in Fig. 3.

A steam-supply pipe 12 leads to a steam chest disposed at one side of the press, and pipes 14, communicating with the intermediate sections of the several press plates, are slidably mounted in the top 15 of the steam chest, so that, irrespective of the positions of the press plates, steam may be supplied to their intermediate sections. Any suitable or well known means may be employed to prevent leakage of steam from the steam chest about the pipes. Disposed at the opposite side of the mold press is an exhaust steam chest 16 which is in communication with the intermediate sections of the several press plates by means of pipes 17, corresponding to the pipes 14, so that steam supplied to the press plates may pass from them to the exhaust chest 16 and from there through an exhaust pipe 18.

Disposed at one side of the mold press and adjacent the end sections of the press plates, are water chests 19 to which water is supplied through pipes 20. Pipes 21, corresponding to the steam-supply pipes 14, lead from the chests 19 to the terminal sections of the press plates. Corresponding pipes 22 lead from the opposite sides of the terminal sections of the press plates to wastewater chests 23 having drain pipes 24.

As the mold press, illustrated in the drawings and above described, is of a conventional form, with the exception of the water-cooler terminal sections of the press plates, I have not deemed it necessary to either illustrate or describe the controlling mechanism. Furthermore, although, in practice, a plurality of composite plates will usually be pressed and molded simultaneously by inserting the various stacked plates between the several press plates of the mold, I will, for the sake of simplicity, merely describe the operation of the mold and the application of my improved method of molding long composite plates as applied to a single composite plate.

In practising my invention, a green body or plate may be formed by superimposing a plurality of layers of suitable fibrous sheet material, such as paper or duck, impregnated with a binder of proper character, such as a phenolic condensation product. This stacked plate must not be greater in width than the width of the press plates but may be of any desired length.

One end of the stacked plate thus formed may be passed through the front of the mold press and disposed between the intermediate sections of a pair of adjacent press plates after which the press may be operated to bring these plates into engagement with the opposite sides of the stacked plate with the required pressure. It is, of course, understood, that the intermediate sections of these press plates are maintained at the desired temperature for molding by a suitable circulation of steam through the pipes 14, the press plates and the pipes 17. After the portion of the composite plate between the press plates has been properly molded and cured, the press may be opened and the composite plate may be advanced through the press until the adjacent uncured portion of the composite plate is disposed between the hot intermediate sections of the press plate when the press is again closed to cure this portion of the composite plate. During the molding or curing of the second portion of the composite plate, that part previously molded and immediately adjacent the part being molded is disposed between the cooled terminal sections 11 at one end of the press plates while a certain uncured portion of the composite plate is disposed between the cooled terminal sections at the opposite ends of the press plates. These portions of the composite plate are, therefore, protected from heat so that the cured portion will not be blistered or otherwise damaged, and the uncured portion adjacent the part being cured will not be partially or prematurely cured which, of course, would cause improper subsequent curing or molding when it was brought between the heated sections of the press plate. The above operations may be repeated until the entire plate has been molded.

From the foregoing explanation, it will be apparent that a composite plate, of any desired length, may be passed through a mold press, of ordinary size, in a step-by-step manner so that successive sections of the composite plate may be molded and cured while, at all times, the portions of the composite plate adjacent the part being cured are protected from heat. It is, therefore, possible to uniformly and efficiently mold a composite plate of any desired length.

Although I have illustrated but one type of mold press, it will be understood that cooled sections may be applied to the press plates of a mold of any desired character and I, therefore, do not wish to restrict myself to any particular mold press but reserve the right to make any changes, both in the press and in the method employed, which may come within the scope of the claims.

I claim as my invention:

1. The method of molding, with heat and pressure, an elongate body of superimposed layers of fibrous sheet material and a binder which comprises successively molding portions of the body until the entire body has been molded while protecting those portions of the body adjacent the portion being molded.

2. The method of molding a plate, formed of superimposed layers of fibrous sheet material impregnated with a phenolic condensation product, which comprises subjecting successive portions of the plate from one end to the other to heat and pressure while protecting portions adjacent those being molded from heat.

3. In a mold press, a pair of coöperating press plates, means for heating corresponding portions of the press plates and means for keeping the remaining portions of the press plates cool.

4. In a mold press, a pair of coöperating press plates, each having an intermediate section and terminal sections, means for heating the intermediate sections and means for cooling the terminal sections.

5. In a mold press, a press plate provided with an intermediate chamber and with terminal chambers.

6. In a mold press, a pair of coöperating press plates, each provided with an intermediate chamber and with terminal chambers, means for supplying a heating fluid to the intermediate chambers and means for supplying a cooling fluid to the terminal chambers.

In testimony whereof I have hereunto subscribed my name this 27th day of June, 1918.

LOUIS T. FREDERICK.